Aug. 28, 1962 A. G. OSTERLUND 3,051,954
AIR BEARING TRANSDUCER WITH GIMBAL RING MOUNTING
Filed May 26, 1958 2 Sheets-Sheet 1

INVENTOR.
ALFRED G. OSTERLUND
BY
Edward A. Robinson
ATTORNEY

Aug. 28, 1962 A. G. OSTERLUND 3,051,954
AIR BEARING TRANSDUCER WITH GIMBAL RING MOUNTING
Filed May 26, 1958 2 Sheets-Sheet 2
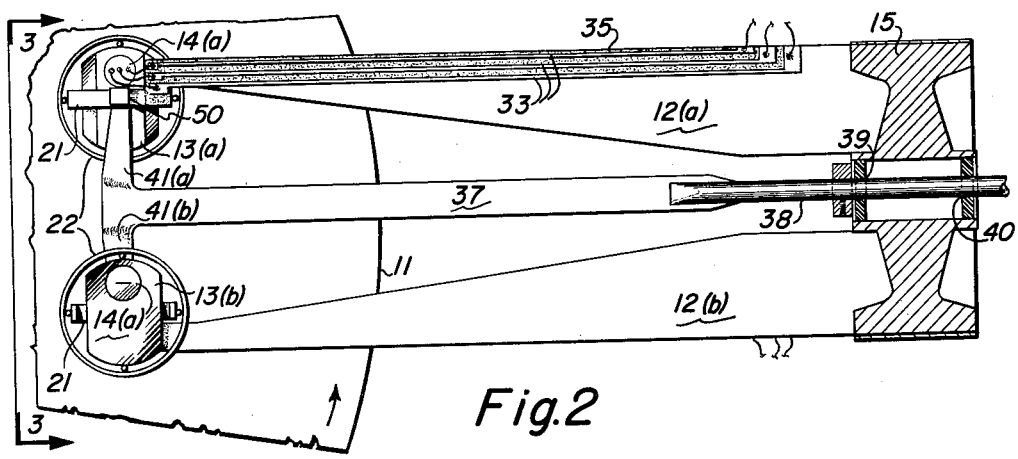
Fig.2
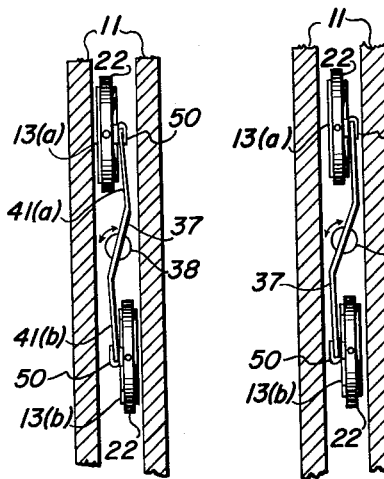
Fig.3   Fig.4
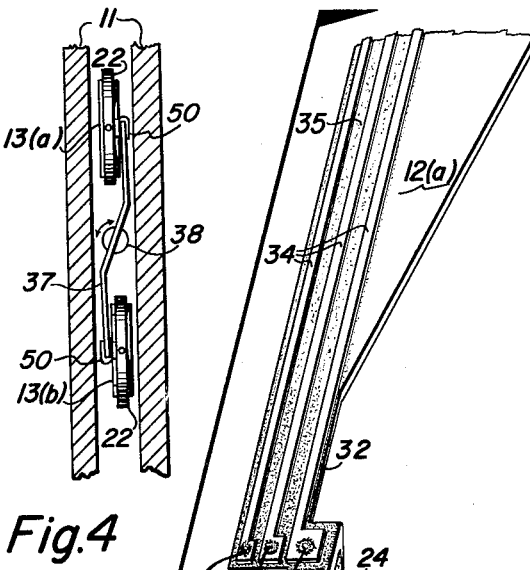
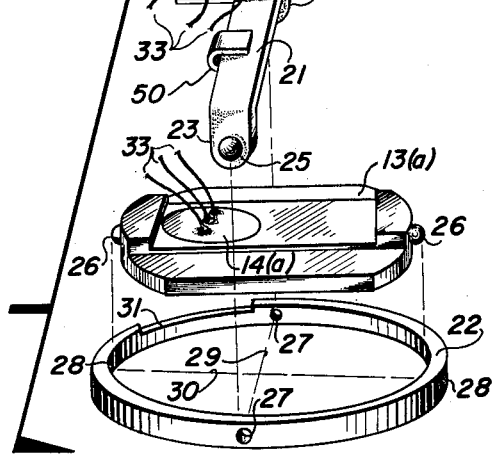
Fig.5

3,051,954
AIR BEARING TRANSDUCER WITH GIMBAL RING MOUNTING
Alfred G. Osterlund, San Jose, Calif., assignor to International Business Machines Corporation, New York, N.Y., a corporation of New York
Filed May 26, 1958, Ser. No. 737,583
7 Claims. (Cl. 346—74)

This invention relates to apparatus for recording and reproducing information, and more particularly to such apparatus including a movable magnetic surface and one or more transducers for converting electrical signals into magnetic bits to be stored in the surface and subsequently for reproducing the electrical signals from the stored magnetic bits.

Heretofore, data processing machines have utilized magnetic storage arrangements wherein a transducer is positioned to magnetically coact with a recording surface. In such arrangements the spacing between the transducer and the moving magnetic surface may be of the order of .0003 to .0005 inch. It has been found that this spacing may be maintained by mounting the transducer in a shoe which provides a flat smooth gliding surface. In operation, the gliding shoe is biased or urged toward the moving recording surface, and the shoe will ride upon, or glide over, a thin film of air which will prevent actual contact with the surface while permitting the transducer to maintain the desired spacing therefrom.

It is an object of this invention to provide a supporting arrangement for a transducer head or shoe which is economical and easily assembled.

It is another object of this invention to provide a supporting arrangement for a gliding shoe such that the shoe may be urged toward the moving surface while being free to pivot into a self-aligned position to glide upon the film of air therebetween.

Another object is to provide a recording system including a plurality of spaced apart recording discs such that a pair of transducer shoes may be inserted into the spaces between each pair of adjacent discs, each of the transducer shoes being supported in a gimbal ring and being urged against a recording surface by a torsion member whereby the transducer shoe will glide upon a film of air thereunder.

Briefly stated, according to this invention, a gimbal ring is provided for supporting a transducer shoe at the end of an access arm. The gimbal ring is pivotally mounted to the access arm along one diameter, and the transducer shoe is positioned within and pivotally mounted along a second diameter of the gimbal ring. Mounting sockets are provided internal to the ring along both of the diameters thereof such that the ring is deformed outwardly and will therefore resiliently sustain both of the pivotal mountings.

Other objects of the invention will be pointed out in the following description and claims and illustrated in the accompanying drawings which disclose, by way of example, the principle of the invention and the best mode which has been contemplated of applying that principle.

In the drawings:

FIG. 2 is a vertical section along the plane 2—2 of FIG. 1.

FIG. 3 is a vertical section along the plane 3—3 of FIG. 2, and shows the transducers in their operative or "loaded" condition FIG. 4 is a vertical section similar to FIG. 3, but illustrating the transducers in an inoperative or "unloaded" condition.

FIG. 5 is an enlarged exploded view of a transducer mounting assembly illustrating the various components thereof in perspective.

Figure 1:
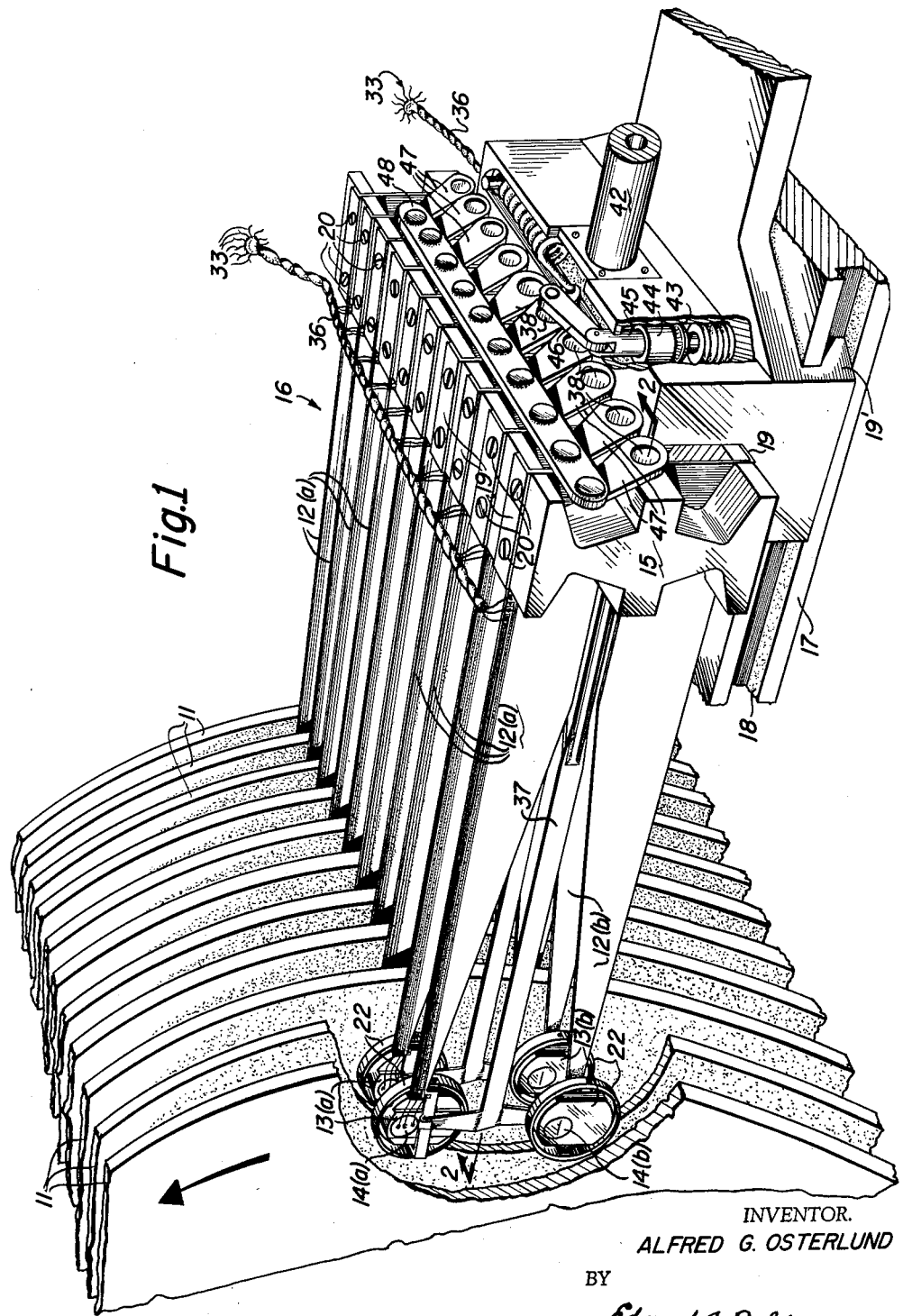
FIG. 1 is a perspective view of a portion of a magnetic recording arrangement and specifically illustrates an access arm assembly with transducers mounted thereon in accordance with the teachings of this invention.

As shown in FIG. 1, the magnetic storage arrangement may comprise a plurality of spaced apart discs 11 which are mounted to rotate in unison. A plurality of access arms 12(a) and 12(b) each support a gliding shoe 13(a) and 13(b) which includes therein a transducer 14(a) and 14(b). The access arms 12(a) and 12(b) are secured to and supported by an arm mounting block 15, and together constitute a head and arm assembly denoted generally as 16. The head and arm assembly 16 is slidably mounted on a stationary part 17 having slide ways 18 thereon into which a flange 19' may extend therein to provide the slide mounting.

The access arms 12(a) and 12(b) may be formed from a sheet metal such as aluminum and will thereby be somewhat resilient such that the transducer end thereof may flex toward the recording surface. A flange 19 (see FIG. 1) is formed from an integral extension of the access arm 12(a)–12(b) which is turned at right angles thereto. The access arms 12(a) and 12(b) are then assembled with the arm mounting block 15 by insertion into transverse slots in the block at the top and bottom thereof, and secured by means such as machine screws 20.

As best shown in FIG. 5, the transducer end of the access arms 12(a) and 12(b) are formed with integral mounting brackets 21 for pivotal support of a gimbal ring 22. The bracket 21 may extend longitudinally of the access arm 12(a)–12(b) and may have downwardly turned ends 23 and 24 to support ball pivots 25.

When assembled, the gliding shoe 13(a)–13(b) is positioned within and encircled by the gimbal ring 22. The gliding shoe 13(a)–13(b) is provided with ball pivots 26 (see FIG. 5) at opposite ends thereof to provide a pivotal axis which is longitudinal of the head and extends in the direction of relative motion of the recording surface. The gimbal ring 22 is formed from resilient material such as spring steel and is provided with holes and sockets 27—28 which are positoned at the ends of two perpendicular diameters 29 and 30. To assemble this apparatus, the gliding shoe 13(a) is pressed into a position within the gimbal ring 22, deforming the ring outwardly along the diameter 30 and causing the ball pivots 26 to seat within the socket holes 28. The access arm 12(a) is then positioned such that the bracket 21 straddles across the gliding head 13(a), and the gimbal ring 22 is forced over the bracket 21 being deformed outwardly along the diameter 29 until the ball pivots 25 become seated in the socket holes 27. A notch 31 may be cut from the ring 22 to provide clearance for a shank portion 32 of the access arm 12(a).

A feature of this invention lies in its economy and ease of assembly. In practice the gliding shoe 13(a) is approximately ¾ inch in length along its axis defined by the pivot points 25 and 26, and the transducer 14(a) is approximately ¼ inch in diameter. These rather small parts are relatively easy to assemble by hand since they snap into place by deforming the resilient ring 22. The ring 22 must be deformed outwardly along its two perpendicular diameters 29 and 30 to encompass both the gliding shoe 13(a) and the bracket ends 23 and 24. Because the ring is deformed similarly, either inwardly or outwardly, along its two diameters 29 and 30, the natural resiliency thereof assures that all of the ball pivots 25—26 will be held securely in the pivotal sockets 27—28.

In the magnetic storage arrangement shown by FIG. 1, the recording surfaces lie on both sides of the rotating discs 11. Each pair of adjacent discs 11 is spaced apart and presents two opposed spaced surfaces, and therefore, two access arms 12(a)–12(b) each carrying a transducer 14(a)–14(b) are positioned to move between each of the adjacent pairs of discs 11. Each of the transducers 14(a)–14(b) is mounted flush in the gliding shoe 13(a)–13(b) to present a continuous gliding surface which may be urged against a moving recording surface. As shown in FIGS. 1, 2, 3 and 4, the gliding shoes 13(a) and 13(b) are arranged to face in opposite directions such that the transducers 14(a) and 14(b) may magnetically coact with their corresponding opposed face magnetic surfaces to develop electrical signals therefrom. The electrical signals are passed from the transducers by electrical conductors 33 (see FIG. 5) that connect with electrically conductive strips 34 which may be formed by printed circuit technique on an insulating backing 35 that is caused to adhere to the access arms 12(a)–12(b).

A particular track for recording or reproducing information may be selected by first moving the head and arm assembly 16 upon its slidable support 17 to locate all of the transducers 14(a)–14(b) at a particular radial position, loading the transducers by applying a force to cause the gliding shoe 13(a)–13(b) to move into close proximity with the respective discs, and then electrically selecting the appropriate transducer and disc surface by a switching means which is not shown but which may be electrically coupled to the transducers by means of the conductors 33 formed into a cable 36.

The loading of each pair of gliding shoes 13(a)–13(b) is accomplished by a T-shaped torsion member 37 (see FIGS. 2, 3 and 4). The torsion member 37 extends from a shaft 38 positioned between the two access arms 12(a) and 12(b) and rotatably mounted in bearings 39 and 40 in the arm mounting block 15. The extreme end of the torsion member 37 is formed into crank arms 41(a) and 41(b) which are mechanically coupled to the brackets 21 which support the gimbal ring 22. A tab 50 formed integral with the bracket 21 is turned back upon itself to receive and secure the ends of crank arms 41(a) and 41(b). FIG. 4 illustrates the assembly in an unloaded or relaxed condition and it may be noted that the gliding shoes 13(a) and 13(b) are spaced apart from the rotating discs 11 by rotation of the shaft 38. In the unloaded or relaxed condition, the shoes may be spaced from the recording surface 0.1 inch, more or less. The torsion member 37 exerts oppositely directed forces against the elements supporting the gliding shoes 13(a) and 13(b), whereupon each of the shoes moves into close spaced relation with its respective recording surface as shown in FIG. 3. Because the gliding shoes 13(a) and 13(b) are mounted in a gimbal ring and are free to pivot about mutually perpendicular axes, the shoes become self-aligning with respect to the moving discs 11 and will glide upon a thin film of air such that the transducers 14(a) and 14(b) will hold a position of approximately .0004 inch from the surface with which they magnetically coact. Since both the access arms 12(a)–12(b) and the torsion member 37 are somewhat flexible, the gliding shoes 13(a)–13(b) are free to move somewhat and to follow the contours of the recording surfaces.

FIG. 1 illustrates the control mechanism for loading or applying force simultaneously against all of the gliding shoes 13(a)–13(b). When it is desired to load the shoes, hydraulic fluid under pressure is passed through a conduit 42 which connects with a cylinder 43, and a shoe loading piston 44 is thereby caused to move upwardly. The piston 44 is mechanically coupled by means of a connecting link 45 and a crank arm 46 to one of the torsion shafts 38'. Each of the shafts 38 and 38' is provided with a crank arm 47 which is pivotally connected to a common connecting link 48. Thus, it may be appreciated that any pivotal movement introduced to the drive shaft 38' will be transmitted to all of the shafts 38 which will then move in unison. Therefore, when hydraulic fluid under pressure is passed through the conduit 42 to the cylinder 43, the piston 44 with its attending mechanical linkage will cause all of the torsion shafts 38 to rotate in a clockwise direction (as illustrated in FIG. 1), and will cause each of the torsion members 37 to exert force against and to load the gliding shoe 13(a)–13(b).

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a recording system having a movable magnetic surface and a transducer shoe adapted to magnetically coact therewith, apparatus for supporting the transducer shoe on an access arm and for urging the transducer shoe toward the magnetic surface, said aparatus comprising an access arm, a resilient gimbal ring pivotally mounted on the access arm, said transducer shoe being pivotally mounted in the gimbal ring, and a loading member operatively associated with the access arm, said loading member being mechanically coupled to apply a force against the access arm whereby the transducer shoe is urged toward the magnetic surface.

2. In a recording system having a movable magnetic surface and a transducer shoe adapted to magnetically coact therewith, apparatus for supporting the transducer on an access arm and for urging the transducer toward the magnetic surface, said apparatus comprising an access arm, a resilient gimbal ring deformable outwardly to pivotally engage and resiliently retain the access arm along a first diameter thereof, said gimbal ring being deformable outwardly to pivotally engage and resiliently retain the transducer along a second diameter thereof, and a torsion member having an arm engaging the access arm for applying a force to urge the transducer shoe toward the magnetic surface whereby the head will self-align with and glide upon the surface.

3. In a recording system having a movable magnetic surface and a transducer shoe adapted to glide upon an air film in close spaced relation with the magnetic surface, apparatus for supporting the transducer shoe in spaced relation with the magnetic surface, said apparatus comprising an access arm having a supporting bracket formed integral therewith, and a resilient gimbal ring having pivotal supports for the transducer shoe and for the bracket of the access arm, said gimbal ring being deformable outwardly along two perpendicular diameters thereof for resiliently retaining the pivotal supports to the transducer shoe and to the bracket.

4. The apparatus according to claim 3 wherein the pivotal supports comprise bearing balls pressed into sockets formed in the transducer shoe and the bracket of the access arm and wherein the gimbal ring is formed with sockets to receive and resiliently retain the bearing balls.

5. In a recording system having a movable magnetic surface and a transducer shoe adapted to glide upon an air film in close spaced relation with the magnetic surface, apparatus for supporting and urging the transducer shoe toward the magnetic surface, said apparatus comprising an access arm having a supporting bracket formed integral therewith, a resilient gimbal ring having pivotal supports for the transducer shoe and for the bracket of the access arm, said gimbal ring being deformable outwardly along two perpendicular diameters thereof for resiliently retaining the pivotal supports to the transducer shoe and to the bracket, and a torsion loading member having a resilient transverse arm at the extremity thereof, said arm engaging the bracket of the access arm whereby the transducer shoe will be resiliently urged toward the magnetic surface when the torsion member is rotated.

6. Magnetic recording apparatus comprising a plurality of spaced apart recording surfaces and a head and arm assembly, said head and arm assembly including a plurality of transducer shoes for magnetically coacting with the recording surfaces, a plurality of access arms arranged in pairs and movable between each adjacent pair of recording surfaces, a gimbal ring pivotally supporting each of the transducer shoes at the end of an access arm, and a torsion member associated with each pair of access arms, said torsion member being operable to exert oppositely directed forces against each of the pair of access arms whereby one of the transducer shoes will be urged against a first recording surface and the other will be urged against opposite recording surface of the spaced apart pair.

7. The magnetic recording apparatus of claim 6 wherein the access arms of each pair extend substantially parallel to each other and wherein the torsion member includes a shank portion positioned between the parallel access arms and a pair of oppositely extending transverse arms at the extremity thereof, each of said transverse arms extending to engage an end part of one of the access arms to exert a loading force thereagainst.

References Cited in the file of this patent

UNITED STATES PATENTS

| | | |
|---|---|---|
| 2,742,536 | Uritis | Apr. 17, 1956 |
| 2,769,037 | Dank et al. | Oct. 30, 1956 |
| 2,772,135 | Hollabaugh et al. | Nov. 27, 1956 |
| 2,802,905 | Taris | Aug. 13, 1957 |
| 2,886,651 | Vogel | May 12, 1959 |

FOREIGN PATENTS

| | | |
|---|---|---|
| 763,780 | Great Britain | Dec. 19, 1956 |
| 805,390 | Great Britain | Dec. 3, 1958 |